(12) United States Patent
Shafet et al.

(10) Patent No.: US 10,997,290 B2
(45) Date of Patent: May 4, 2021

(54) ENHANCING COMPUTER SECURITY VIA DETECTION OF INCONSISTENT INTERNET BROWSER VERSIONS

(71) Applicant: PayPal, Inc., San Jose, CA (US)

(72) Inventors: Yuri Shafet, Beersheba (IL); Ilya Chernyakov, Givat Shmuel (IL)

(73) Assignee: PAYPAL, INC., San Jose, CA (US)

( * ) Notice: Subject to any disclaimer, the term of this patent is extended or adjusted under 35 U.S.C. 154(b) by 268 days.

(21) Appl. No.: 16/150,735

(22) Filed: Oct. 3, 2018

(65) Prior Publication Data
US 2020/0110874 A1 Apr. 9, 2020

(51) Int. Cl.
H04L 29/06 (2006.01)
G06F 21/55 (2013.01)
G06F 21/36 (2013.01)
G06F 21/52 (2013.01)

(52) U.S. Cl.
CPC ............ *G06F 21/552* (2013.01); *G06F 21/36* (2013.01); *G06F 21/52* (2013.01); *H04L 63/20* (2013.01)

(58) Field of Classification Search
CPC ........ G06F 21/552; G06F 21/36; G06F 21/52; H04L 63/20
USPC .......................................................... 726/22
See application file for complete search history.

(56) References Cited

U.S. PATENT DOCUMENTS

| 7,596,780 | B2 |   | 9/2009  | Selitrennikoff et al. |
| 7,725,574 | B2 | * | 5/2010  | O'Connell .......... G06F 11/0781 709/224 |
| 7,962,961 | B1 |   | 6/2011  | Griffin et al. |
| 8,607,346 | B1 | * | 12/2013 | Hedge ................. H04L 63/1416 726/23 |
| 8,650,080 | B2 | * | 2/2014  | O'Connell ......... G06Q 20/4016 705/14.47 |
| 8,751,685 | B2 |   | 6/2014  | Parsons |
| 8,756,617 | B1 | * | 6/2014  | Boodman ............... G06F 21/57 719/328 |
| 8,997,226 | B1 | * | 3/2015  | Call .................... H04L 63/1416 726/22 |
| 9,986,058 | B2 |   | 5/2018  | Li |
| 2007/0094732 | A1 |   | 4/2007 | Mood et al. |

(Continued)

FOREIGN PATENT DOCUMENTS

| WO | 2016086765 A1 | 6/2016 |
| WO | 2017054731 A1 | 4/2017 |

*Primary Examiner* — Michael S McNally
(74) *Attorney, Agent, or Firm* — Haynes and Boone, LLP

(57) ABSTRACT

A request to access one or more server resources is received from a user device. Based on the request, a purported version of a browser running on the user device is determined. The user device executes a program within the browser, according to various embodiments, which throws one or more exceptions associated with one or more particular browser versions. The results of the exceptions may be analyzed to determine whether the purported version of the browser appears to be a true version of the browser. If the analysis indicates that the purported version of the browser is not accurate, the request to access the one or more server resources may be evaluated at an elevated risk level. Inaccurately reported browser versions may indicate an attempt to gain unauthorized access to an account, and thus, being able to detect a falsely reported browser version can help improve computer security.

16 Claims, 7 Drawing Sheets

(56) References Cited

U.S. PATENT DOCUMENTS

| | | |
|---|---|---|
| 2012/0180129 A1 | 7/2012 | Shulman et al. |
| 2014/0201815 A1 | 7/2014 | Van Nieuwenhuyze et al. |
| 2014/0380477 A1 | 12/2014 | Li et al. |
| 2016/0359904 A1* | 12/2016 | Ben Ezra ............... H04L 63/08 |
| 2018/0004765 A1* | 1/2018 | Holloway ............... H04L 67/28 |
| 2019/0149567 A1* | 5/2019 | Bailey .................... H04L 63/20 726/23 |

* cited by examiner

ENHANCING COMPUTER SECURITY VIA DETECTION OF INCONSISTENT INTERNET BROWSER VERSIONS

BACKGROUND

Technical Field

The present disclosure generally relates to computer security, and more particularly, to enhancing computer security via the detection of inconsistencies in a version of an Internet browser running on a user device.

Related Art

Rapid advances have been made in the past several decades in the fields of computer technology and telecommunications. Many of these electronic activities are conducted using Internet browsers such as FIREFOX™ or INTERNET EXPLORER™. An entity may exploit weaknesses (e.g., bugs) within a browser to perpetrate various activities, including but not limited to malicious activities geared towards another user. For example, such an entity may cause a browser of a user device to misreport the current version of the browser, in order to evade possible fraud detection. In particular, older versions of computer web browsers may be modified to allow for easier execution of malicious attacks in order to achieve account takeover (ATO) or to perpetrate unauthorized electronic transactions. Unfortunately, existing systems and methods have not sufficiently leveraged this fact to improve computer security. What is needed is a method and a system that can detect potential fraudulent and/or malicious activities based on inconsistencies between self-reported browser information and actual browser information retrieved from the browser running on a device.

DETAILED DESCRIPTION

Figure 1:
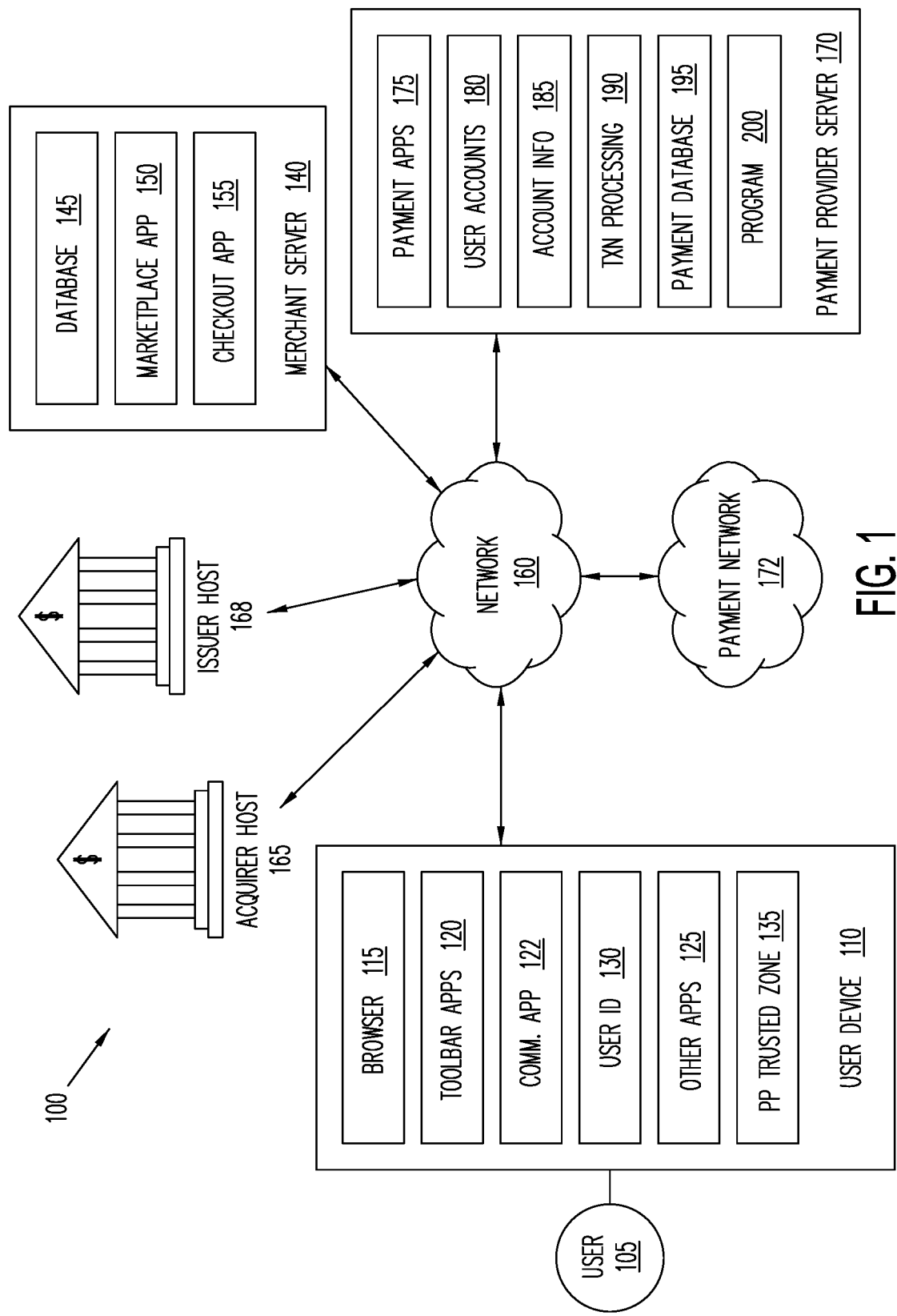
FIG. 1 is a simplified block diagram of a networked system according to various aspects of the present disclosure.

It is to be understood that the following disclosure provides many different embodiments, or examples, for implementing different features of the present disclosure.

Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic activities become increasingly more prevalent. For example, more and more people are using the Internet to perform various daily tasks such as banking, buying goods/services, consuming media, paying bills, etc. Many of these tasks can be accomplished using an Internet browser such as FIREFOX™ or INTERNET EXPLORER™. However, browsers may have bugs that allow them to be exploited—particularly older or outdated versions of those browsers. For example, a malicious entity (e.g., a hacker) may use a modified browser to gain access to a user's account. In these situations, the modified browser usually is running an older version, since modifications that allow for malicious use (e.g. multithreaded access to try to crack a password or otherwise bypass security measures) takes time for malicious actors to develop, and it is uncommon for a malicious actor to modify the most current version of a browser to allow for faster exploitation. In order to evade detection, the malicious entity may intentionally misreport the version of the currently-used browser (e.g., via a "navigator" property of the browser) as a newer version (e.g., version 10), when in fact it is an older version (e.g., version 6). This is because an older version of the browser may raise suspicion or draw scrutiny from fraud-detection entities. Unfortunately, existing fraud detection systems and methods have not necessarily been able to obtain the misreported browser information as an indicator of potential fraud.

The present disclosure detects potential fraud via inconsistencies in browser information, such as browser type or browser version inconsistencies, which may be indicative of a higher level of risk for an electronic transaction (e.g. login, currency transfer, etc.) than an electronic transaction that is actually taking place using the most current version of a web browser. For example, a server may receive a request from a user's device to access server resources (e.g., the user's account). The request may include a version of a browser that is reportedly running on the user device. In response to this request, the server may cause a program (e.g., in JavaScript) to be executed within a user's browser. Such a program may be specifically designed to throw one or more exceptions when executed by certain browser versions but not by other browser versions, as these flaws may have been remedied by software developers in the newer releases of that particular browser. In some embodiments, the exceptions are thrown for older versions of a browser, but not newer versions of the browser. In other embodiments, the exceptions are thrown only for one or more particular versions of the browser (e.g. versions 7-9 but not versions 6 or 10, among various possibilities). The server analyzes the result of the exceptions to determine whether the browser version reported by the user device is consistent with what appears to be a true version of the browser.

Similarly, inconsistencies between the type of browser reported being used and actually used may be discovered by the execution of a program on the device that is running the browser as well. For example, the device may report that it is running a common browser such as CHROME™, but the execution of the program returns errors that can only be caused by a headless browser such as PhantomJS—often used to automate web page interactions—an inconsistency between the purported and actually used browser type exists.

If there is an inconsistency between the browser version or type, it may indicate that the browser has been compromised, which could be caused by a malicious entity that has "spoofed" the browser, or in some instances by the user himself/herself (e.g., for anonymity reasons). Accordingly, the server may evaluate the request to access the server resources at an elevated risk in response to the detection of inconsistent browser versions or inconsistent browser types.

In some embodiments, the server may cause the user device to perform a "Completely Automated Public Turing test to tell Computers and Humans Apart" (CAPTCHA) test. This is because hackers/fraudsters often use bots to hijack or spoof a user's browser. If the purported "user" fails the CAPTCHA test, it may further indicate that the request was indeed sent by a bot, rather than the legitimate human user himself/herself. If the server determines that the user is a human user (based on the CAPTCHA test), the server may flag the account of the user and inform the user that suspicious activity has been detected in association with the user's account, so that the user may be aware that his/her account could have been compromised and then take remedial actions. On the other hand, if the server determines that the user is a bot, then it may disable the account of the user and/or send notifications to the user accordingly.

As summarized above and discussed in more detail below, the present disclosure is integrally tied to specific technology environments (e.g., online browsing and fraud prevention). The present disclosure also improves the functionality of a computer at least part via the implementation and execution of a program (e.g., JavaScript) to easily and effectively catch potential fraud. The various aspects of the present disclosure will be discussed below in more detail with reference to FIGS. 1-7.

FIG. 1 is a block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL™, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

As discussed above, browsers may have bugs or other security weaknesses in prior versions, which may be fixed or improved upon in later versions. An entity with malicious intent—such as a hacker or a carder (e.g., traffickers of credit cards, bank accounts, or other user personal information online)—may exploit the shortcomings of an older version of the browser to perpetrate fraud. For example, the malicious entity may pretend to be the user 105 while using the browser application 115 to access sensitive information or resources that should be available only to the user.

To avoid raising suspicion, the malicious entity may manipulate the browser application 115 to report various incorrect parameters such as user-agent, screen height/width, or a version of the browser application 115. For example, the most recent version of the browser application 115 may be version 20, but the actual version of the browser application 115 running on the user device 110 is version 12, which has bugs or security weaknesses that allow the browser application 115 to be spoofed by the malicious entity. The malicious entity may manipulate a navigator property of the browser application 115 such that the browser application 115 reports that it is running version 20 (the most recent version), when in fact it is running a much older version (e.g., version 12). The present disclosure uses a program to detect these inconsistencies between the purported and actual versions of the browser application 115 in order to monitor suspicious activities, as discussed below in more detail. A malicious actor may also use an anti-detect browser to avoid detection. For example, the anti-detect browser may claim to be CHROME™ version 15 when browsing a website hosted by the server 170. The server 170 may execute a program on the machine on which the anti-detect browser is running, where the program should cause the CHROME™ version 15 browser to throw an exception. If no exceptions are thrown, or the thrown exceptions are not what the CHROME™ version 15 is expected to throw, the server 170 may determine that the browser has been spoofed, possibly by a malicious entity.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may also include a program 200. In some embodiments, the program 200 may be in a web scripting language, such as JavaScript. The server 170 may send the program 200 to the user device 110 for execution, for example within the browser application 115. The program 200 is configured to cause exceptions to be thrown by the browser application 115, where the exceptions thrown are specific to one or more particular versions of the browser application 115. The results of the exceptions (or the lack thereof) are fed back to the payment provider server 170 for analysis. If the analysis indicates that the exceptions thrown reveals that the actual version of the browser application 115 is inconsistent with the version the browser application purports to be running, it may be a sign of suspicious activity. The payment provider server 170 may take appropriate actions in response to the determination of suspicious activity, including but not limited to flagging the account of the user 105, sending notifications to the user 105, or raising a security requirement for accessing the account of the user 105, etc.

It is understood that although the embodiment of FIG. 1 illustrates the program 200 as residing on the payment provider server 170, this is not intended to be limiting. In some embodiments, the program 200 (or a similar tool) may be implemented on the user device 110 and may be called for execution by external entities such as the payment provider server 170. In other embodiments, the program 200 (or a similar tool) may also be implemented on the merchant server 140, so that the merchant server 140 may also perform the tasks of causing the browser application 115 to return exceptions, analyzing the results of the exceptions to determine whether the purported version of the browser application is consistent with the true version of the browser application 115, and determining whether potentially fraudulent activities have taken place on the user device 110 based on the browser version analysis, etc. In yet other embodiments, the program 200 may be divided in parts, whether some parts are implemented on the payment provider server 170, while other parts are implemented on the user device 110 and/or the merchant server 140. Furthermore, although the program 200 is illustrated as being separate from the transaction processing application 190 in the embodiment shown in FIG. 1, the transaction processing application 190 may implement some, or all, of the functionalities of the program 200 in other embodiments. In other words, the program 200 may be integrated within the transaction processing application 190 in some embodiments. The features and functionalities of the program 200 will be discussed later in more detail with reference to FIGS. 2-7.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
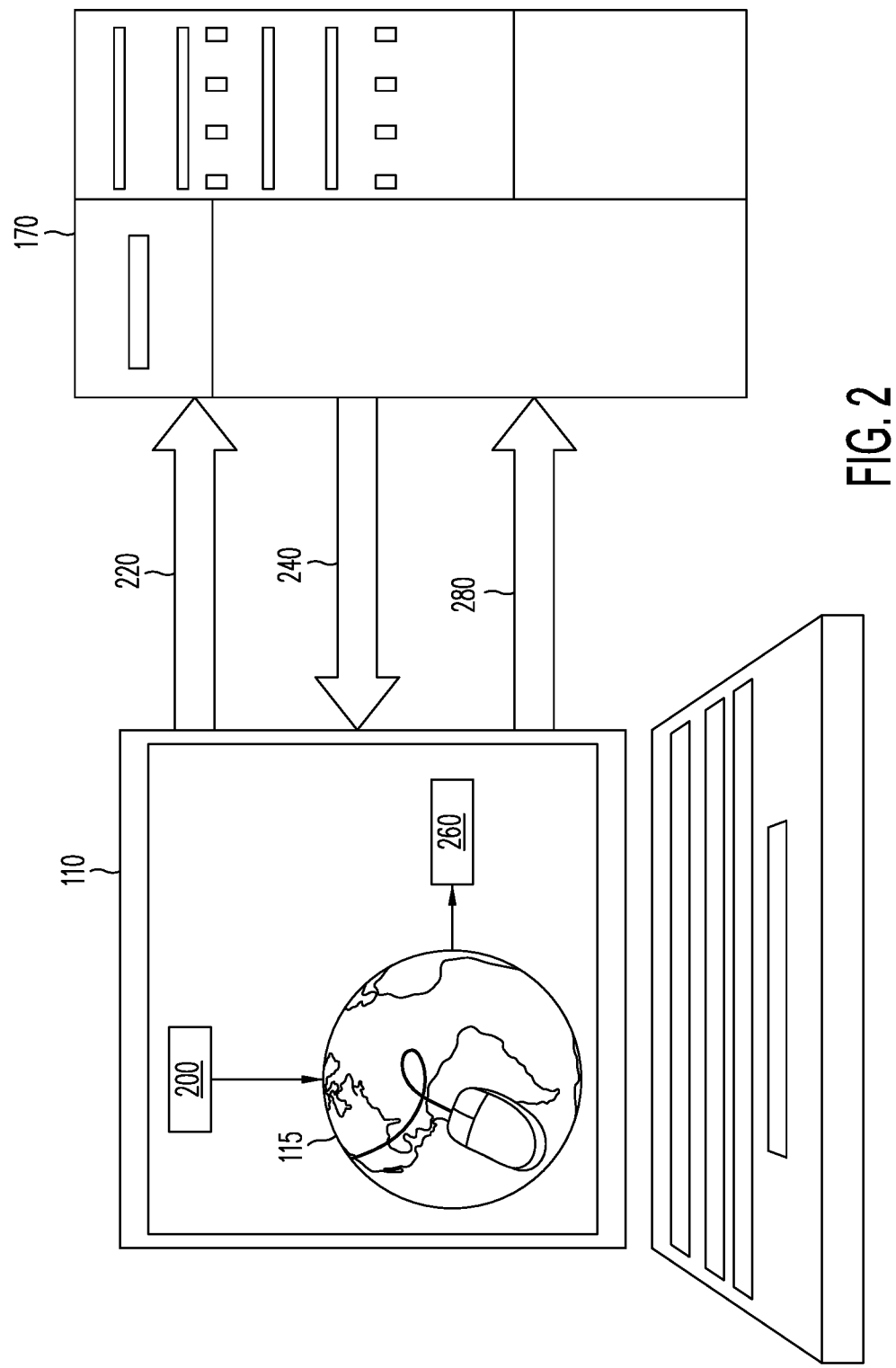
FIGS. 2-3 are block diagrams that illustrate interactions between a device and a server according to various aspects of the present disclosure.

FIG. 2 illustrates the interactions between the user device 110 and the payment provider server 170 according to embodiments of the present disclosure. Note that the user device 110 is not limited to the device (e.g., a desktop/laptop/tablet computer or a smart phone) of the user 105 of FIG. 1. In various embodiments, the user device 110 may be any suitable device that seeks to access a resource of the server payment provider 170. For example, the user device 110 may be a device of not an individual user but a corporate entity. Meanwhile, the payment provider server 170 may be a server of another entity, for example the merchant server 140 or the server of a fraud detection entity. For reasons of simplicity, the user device 110 and the payment provider server 170 may be interchangeably referred to as the device 110 and the server 170 hereinafter.

Referring to FIG. 2, the server 170 receives a request 220 from the device 110 to access one or more resources of the server 170, for example to access an account of a user associated with the device 110. The request 220 may report, to the server 170, a version of the browser application 115 that is currently running on the device 11. Upon receiving the request 220, the server 170 may perform an operation 240, in which the server 170 causes the device 110 to execute the program 200 on the device 100, for example as a JavaScript (or another suitable web scripting language) within the browser application 115. In some embodiments, the program 200 may be sent electronically by the server 170 to the device 110 as a part of the operation 240. In other embodiments, the program 200 may already be stored on the device 100, and the server 170 merely sends a command or a trigger to instruct the program 200 to execute within the browser application 115.

The execution of the program 200 causes the browser application 115 to throw one or more exceptions 260. Generally, exceptions may be associated with errors that occurred during an execution of a computer program. For example, when a computer program (e.g., the browser application 115) runs into an error during its execution, the computer program may create an object and hands the object to a runtime system for handling. The object may be considered an exception and may contain information about the error that occurred, as well as the circumstances under which the error occurred. The process of creating the object in response to the occurrence of the error and handing it to the runtime system may be referred to as throwing an exception. Below is a non-limiting example of the exception 260:

0x80004001 (NS_ERROR_NOT_IMPLEMENTED) [nsIDOMNavigator.buildID]

According to aspects of the present disclosure, the type of exceptions thrown by the browser application 115 may be correlated with the actual version of the browser application 115. For example, a first type of exception 260 thrown may indicate that the browser application 115 is older than a certain version (e.g., version 15 or older), and a second type of exception 260 thrown may indicate that the browser application 115 is older than another certain version (e.g., version 10 or older). In some embodiments, the program 200 causes specific exceptions 260 to be thrown for particular versions of the browser application 115. For example, a first type of exception 260 may be thrown if the browser application 115 is running on version 1, a second type of exception 260 may be thrown if the browser application 115 is running version 2, a third type of exception 260 may be thrown if the browser application 115 is running version 3, so on and so forth. Generally, each type of browser or each version of a specific type of browser may have their own unique errors that cause exceptions to be thrown, which means that it is possible to correlate different types of returned exceptions 260 with their respective browser types/versions. In some embodiments, information regarding the exception 260 may also include an electronic memory location where the exception occurred. The electronic memory location may provide further insight as to what type or version of the browser application 115 was actually running on the device 110 when the exception 260 occurred. In this manner described above, the type of exception 260 thrown may be associated with a true version of the browser application 115.

Below are some non-limiting examples of the code that can be used to implement the program 200. As a first example, the code may be implemented in the form of a try-catch statement:

```
try{
        for (var i in navigator) { navigator[i];}
} catch(err){
        //Here we test if exception is occurred and what type of
        exception.
        // if needed we send it to server.
}
```

As a second example, the program 200 may contain code that detects not just a version of a browser, but a specific type of browser, such as MICROSOFT™ EDGE™:

```
try{
        for (var i in window) window[i];
} catch (err){
        //if we got exception here we have edge version < 17
}
```

As a third example, the code for the program 200 may be implemented to catch headless browsers, such as a PhantomJS browser. Headless browsers may not have a graphical user interface and may be used to automate web page interactions. Due to these unique characteristics, headless browsers such as the PhantomJS browser may be used for legitimate purposes but may also be used maliciously. Since headless browsers may often be associated with increased security risk, the program 200 may have code (see below) to detect various types of headless browsers such as the PhantomJS browsers:

```
try{
        Null[0]( );
}catch(err){
        //check if 'phatom' in error stack
}
```

In an operation 280, the server 170 retrieves from the device 110 the information regarding the exception 260 thrown by the browser application 115. The server 170 analyzes the information regarding the exception 260 to determine whether the version of the browser that is self-reported by the user device 110 (e.g., as a part of the request 220) is consistent with the exception 260. For example, the request 220 may report that the browser version is version 20 (e.g., the latest and most recent version of the browser). However, the type of exception 260 thrown by the browser application may indicate that the browser application 115 is actually running a version older than version 15, because the exceptions should only be thrown by versions older than 15.

The inconsistency between the purported version (e.g., version 20) of the browser application 115 and the true version (e.g., version 15 or older) of the browser application 115 may indicate that suspicious activity has taken place on the device 100. For example, the inconsistency regarding the purported and actual browser versions may indicate that the browser application 115 has been spoofed. In that regard, a malicious entity often will hijack or spoof a victim's browser—which may be running an older version—to exploit the older version's bugs and/or security weaknesses. Since older versions of browsers are prone to being exploited, servers or other entities that interact with the browsers may apply a heightened level of scrutiny to them. Malicious entities understand this practice as well, and in the effort of evading detection, they may spoof the browser application 115 so that it will report an incorrect version of itself. For example, by revising a navigator property of a browser application 115, the browser application 115 may report that it is running version 20, when in fact it is running version 12, for example. The present disclosure utilizes the program 200 to detect such an inconsistency between the purported and actual browser versions, which is an indication of potential fraud, since legitimate users typically have no reason to lie about the version of the browser they are using.

If the server determines that the purported type or version of the browser application 115 is inaccurate (e.g., because it is inconsistent with what the exception 260 indicates), the server 170 may deem the browser application 115 spoofed, and then process the request 220 with an elevated risk level. For example, the server 170 may flag an account of the user pertaining to the request 220. In some embodiments, the server 170 may determine whether the user (or the device 110 from which the request 220 is sent) is a human user or a bot. If the server 170 determines that the user is still a human user (e.g., a victim whose device 110 has been hacked), the server 170 may send notifications to the user, for example to the user's email address or phone number on file, alerting the user that suspicious activity has taken place on the device 110. The server 170 may then process the request 220 upon receiving approval or authorization from the user. On the other hand, if the server 170 determines that the user may be a bot (or that the request 220 came from a bot), the server 170 may instruct the device 110 to perform a CAPTCHA test, such as solving a puzzle or identifying certain images and/or obfuscated text. If the user passes the CAPTCHA test, the server 170 may partially or wholly grant the request 220. If the user fails the CAPTCHA test, the server 170 may disable an account of the user until the user can prove that he/she has regained control of the device 110, and that the device 110 is no longer operating in a malicious environment.

Of course, there are circumstances where a legitimate user may modify the browser application 115 to intentionally misreport the version of the browser too. For example, a user may be concerned about protecting his/her own privacy and does not wish to share the true browser information with outside parties. As another example, a user may have to modify the browser to avoid content issues. For example, a badly configured website may only work with a selected group of browsers or browser versions, and as such the user may have to modify the browser—by misreporting the browser type and/or version—so that the browser application 115 may work with the website. Thus, even if browser inconsistencies are detected, the server 170 may still try to distinguish the malicious entities from the legitimate users themselves. For example, instead of disabling the account of the user right away, the server 170 may send alerts to the user to inform the user of the detection of potentially fraudulent activity. The server 170 may also send the user a set of security questions for which the user has previously provided the correct answers. If the user can answer these questions correctly, the server 170 may grant the request 220.

It is understood that although FIG. 2 illustrates just one program 200 for execution within the browser application 115, this is not intended to be limiting. In other embodiments, the server 170 may cause multiple programs 200 (or multiple scripts within the program) to be executed, where each program is configured to cause different exceptions to be thrown corresponding to different browser types/versions. For example, the server 170 may first cause a first program to be executed within the browser application 115, where the first program is configured to throw exceptions if the browser application 115 is older than version 10. If the browser application 115 passes this test, then the server 170 may cause a second program to be executed within the browser application 115, where the second program is configured to throw exceptions if the browser application is older than version 15 but not as old as version 10. If the browser application 115 passes this test again, the server 170 may cause a third program to be executed, where the second program is configured to throw exceptions if the browser application is between version 15 and the newest version (e.g., version 20) of the browser. If the browser application fails the test at any point, the server 170 may cause different programs to narrow down the specific browser type/version that is actually running on the device 110. This process may be iteratively run for a number of times until the browser application 115 either passes all tests or has a failure that reveals its specific browser type/version.

It is also understood that the program 200 facilitates the detection of not just the inconsistencies between the purported and actual versions of the same type of browser, but also the inconsistencies between the purported and actual types of the browser. For example, as discussed above, a scripted headless browser such as PhantomJS may be commonly used for automating webpage interactions. Since PhantomJS does not have a graphical user interface, it is not the preferred browser type for most users. In addition, the capability of PhantomJS to automate the webpage interactions makes it an ideal candidate for perpetrating nefarious activities. As such, it may be suspicious when the device 110 reports that its browser application 115 is a non-headless browser, but the execution of the program 200 returns a specific exception that indicates that the browser application is indeed a headless browser such as PhantomJS. This inconsistency between the browser types may be an indication that the device 110 has been compromised and/or is operating in a malicious environment. The server 170 may then take appropriate actions discussed above, such as raising the security level with respect to processing the request 220, alerting the user, etc.

A malicious actor may also use an anti-detect browser to avoid detection. For example, the anti-detect browser on the device 110 may claim to be CHROME™ version 15 when browsing a website hosted by the server 170. The server 170 may cause the execution of the program 200 on the device 110. The program 200 is configured to cause a true CHROME™ version 15 browser to throw one or more specific exceptions. If no exceptions are thrown, or the thrown exceptions are not what the CHROME™ version 15 is expected to throw, the server 170 may determine that the browser has been spoofed, possibly by a malicious entity, and that the purported browser may be an anti-detect tool. This may be another example of a browser type inconsistency, and the server 170 may again take appropriate measures in response to such an inconsistency, such as raising the security level with respect to processing the request 220, etc.

Figure 3:
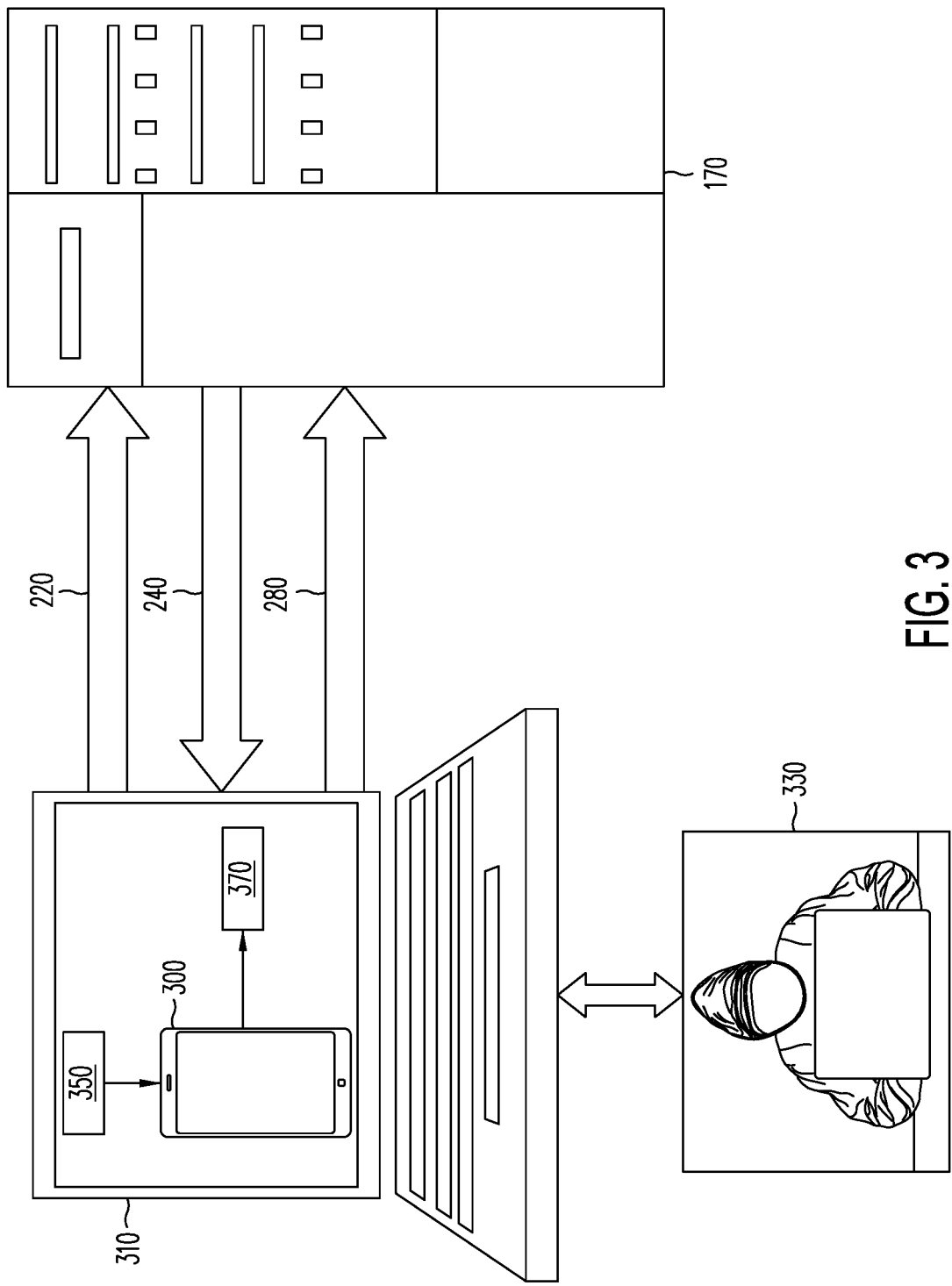

The headless browser may be considered a malicious tool, but it is not the only type of malicious tool that can be detected. A malicious entity may employ other types of malicious tools to conduct illicit activities such as taking over a user's account. FIG. 3 illustrates the interaction between an example malicious tool 300 and the server 170. Referring to FIG. 3, the malicious tool 300 may be implemented on a device 310, which may be a desktop computer or a laptop computer. The device 310 may be a device of a malicious entity 330. In some embodiments, the malicious tool 300 may include an emulator, such as a smartphone emulator that emulates the features and functionalities of a smartphone. As such, the malicious tool 300 may pretend that it is actually a smartphone of a user (e.g., the user 105 of FIG. 1) and send the request 220 to the server 170 to access server resources, for example the account of the user 105.

The server 170 may not immediately know whether the request 220 received is from a legitimate user, or from a malicious tool. According to embodiments of the present disclosure, the server 170 may send (e.g., via the operation 240) a program 350 to be executed by the malicious tool 300. Similar to the program 200 discussed above, the program 350 may be in the form of a scripting language such as JavaScript, and it may be configured to cause the malicious tool 300 to crash and/or return specific errors 370. Had the program 350 been executed by a legitimate smartphone, for example by a mobile application of the server 170 designed to run on a mobile platform such as IOS™ or ANDROID, there would have been no crash or error. Thus, the occurrence of the crash or error 370 in response to the execution of the program 350 indicates that the malicious tool 300 may not be what it claims to be (e.g., since it claims to be a smartphone or a mobile application running on a smartphone).

Via the operation 280, the server 170 retrieves and analyzes information regarding the results (e.g., the error 370) of the execution of the program 350. Based on the analysis of the occurrence of the error 370, the server 170 may determine that the request 220 likely did not originate from a legitimate smartphone but rather from the malicious tool 300. Again, the server 170 may process the request 220 at a heightened security level, for example flagging the account of the user, instituting additional authentication requirements, and/or alerting the user of potentially unauthorized attempt to access the user's account.

Figure 4:
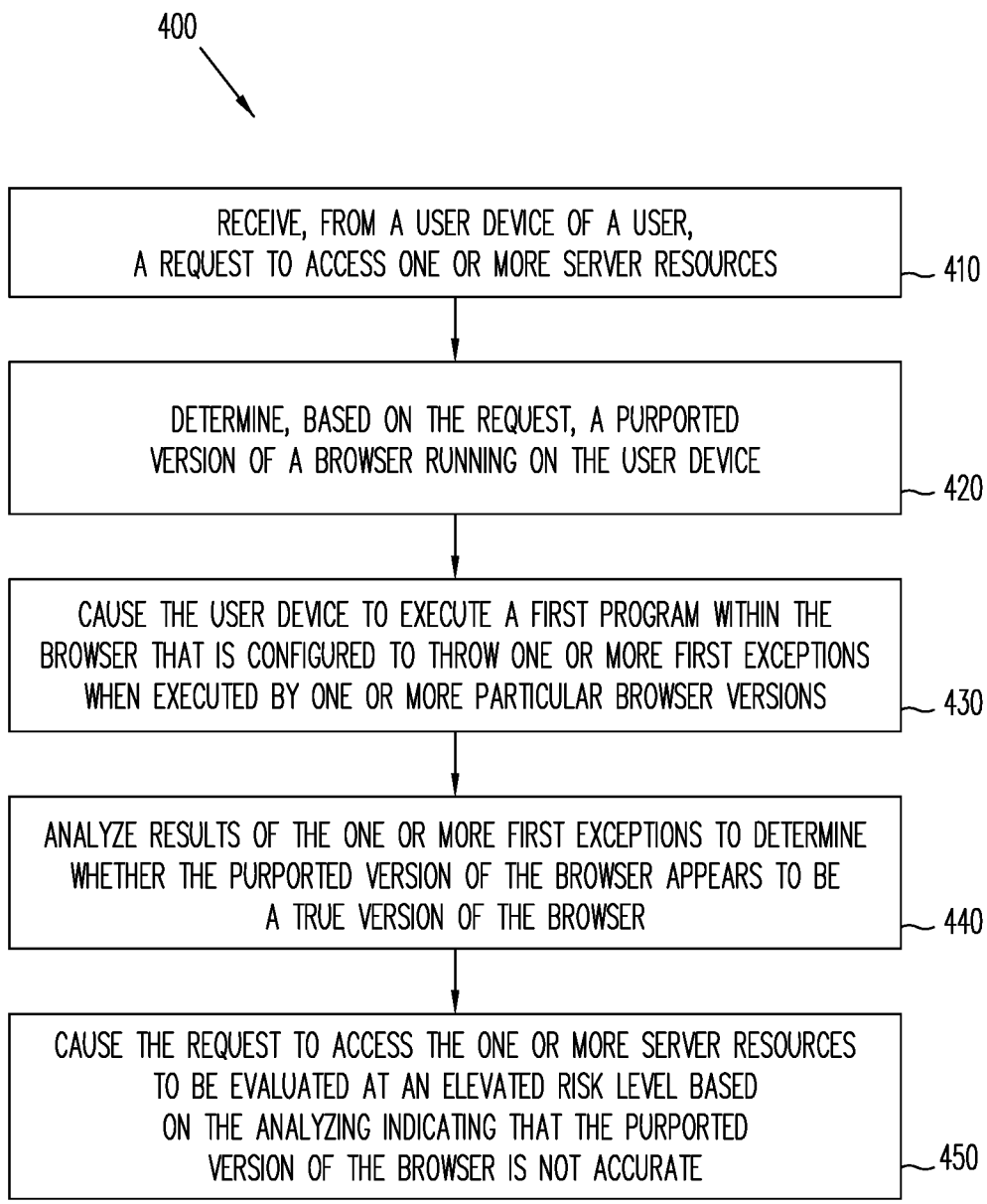
FIGS. 4-5 are flowcharts illustrating methods according to various aspects of the present disclosure.

Referring now to FIG. 4, a flowchart of a method 400 is illustrated. The method 400 describes an example process flow to detect potential fraud by analyzing browser versions on a user device. The method 400 includes a step 410, in which a request to access one or more server resources is received from a user device of a user.

The method 400 includes a step 420, in which a purported version of a browser running on the user device is made based on the request.

The method 400 includes a step 430, in which the user device is caused to execute a first program within the browser that is configured to throw one or more first exceptions when executed by one or more particular browser versions.

The method 400 includes a step 440, in which results of the one or more first exceptions are analyzed to determine whether the purported version of the browser appears to be a true version of the browser.

The method 400 includes a step 450, in which the request to access the one or more server resources is caused to be evaluated at an elevated risk level based on the analyzing indicating that the purported version of the browser is not accurate.

In some embodiments, the first program is in a web scripting language that is executable within the browser, for example JavaScript.

In some embodiments, the analysis in step 440 comprises determining a location within an electronic memory on the user device where the exception occurred.

It is understood that additional method steps may be performed before, during, or after the steps 410-450 discussed above. For example, in some embodiments, the method 400 may include a step of causing the user device to execute a second program that is configured to throw one or more second exceptions. In that case, the analysis in step 440 comprises analyzing the one or more first exceptions and the one or more second exceptions. In some embodiments, the first program is configured to throw the one or more first exceptions for a first group of versions of the browser or a first type of the browser, and the second program is configured to throw the one or more second exceptions for a second group of versions of the browser or a second type of the browser.

As another example, the method 400 may include a step of determining that the browser has been spoofed in response to the analyzing indicating that the purported version of the browser is not accurate. In response to a determination that the browser has been spoofed, the user device may be caused to perform a CAPTCHA test, and a determination is made, based on a result of the CAPTCHA test, whether the user is a human user or a bot. In some embodiments, in response to a determination that the user is a human user, an account of the user is flagged, or the user is notified that suspicious activity has been detected in association with the account of the user. In some embodiments, in response to a determination that the user is a bot, an account of the user is disabled.

As yet another example, the method 400 may determine, based on the request, a purported type of the browser running on the user device. Based on the analyzing, a determination is made as to whether the purported type of the browser appears to be a true type of the browser. If the purported type of the browser does not appear to be the true type of the browser, the request to access the one or more server resources is evaluated at the elevated risk level.

Figure 5:
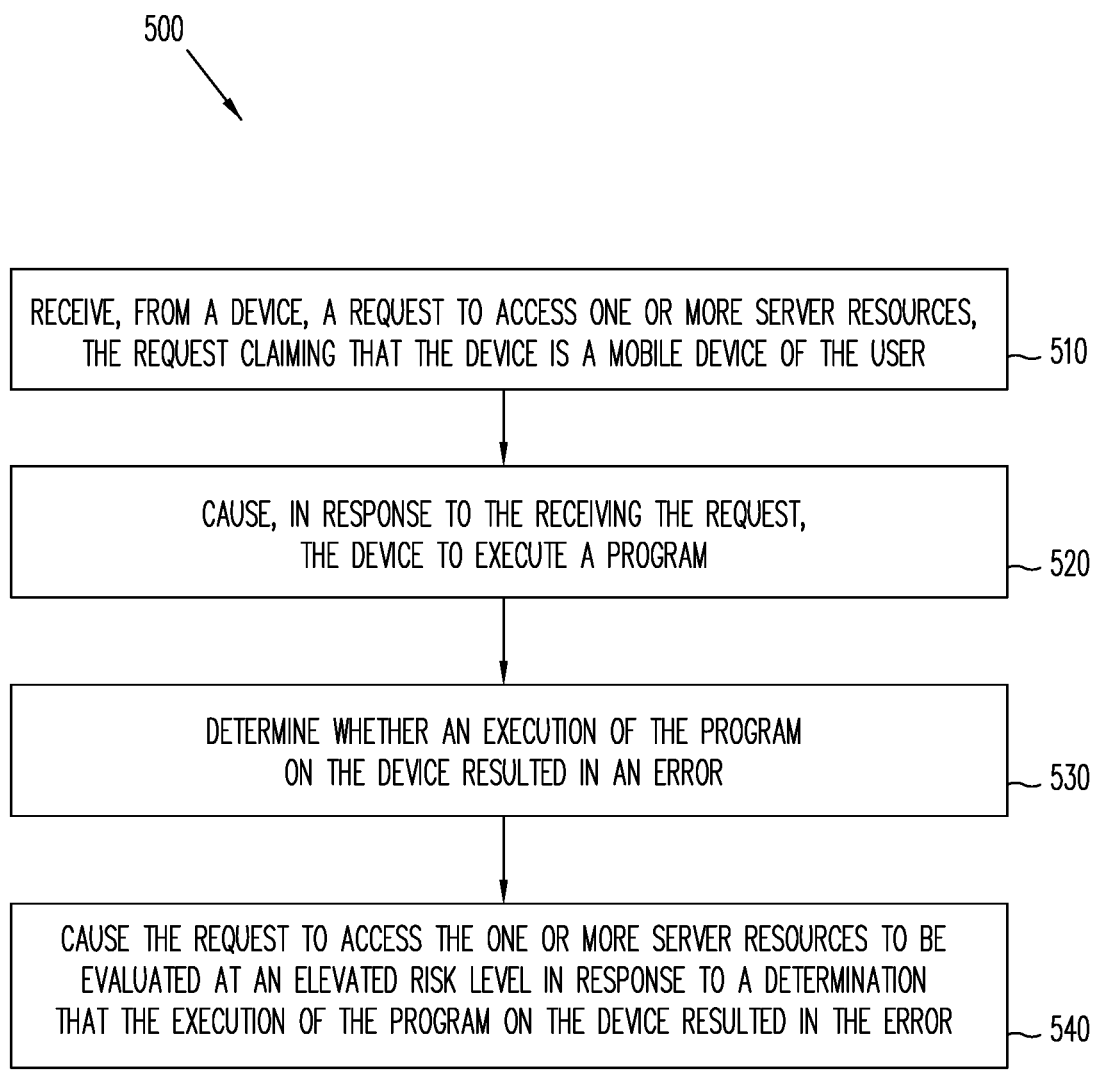

FIG. 5 is a flowchart illustrating a method 500 describing an example process flow for detecting potential fraud. The method 500 includes a step 510, in which a request to access one or more server resources is received from a device. The request claims that the device is a mobile device of a user.

The method 500 includes a step 520, in which in response to the received the request, the device is caused to execute a program. In some embodiments, the step 520 includes sending the program to the device for execution.

The method 500 includes a step 530, in which a determination is made as to whether an execution of the program on the device resulted in an error.

The method 500 includes a step 540, in which the request to access the one or more server resources is caused to be evaluated at an elevated risk level in response to a determination that the execution of the program on the device resulted in the error.

It is understood that additional method steps may be performed before, during, or after the steps 510-540 discussed above. For example, in some embodiments, the method 500 may include a step of determining that the device is not the mobile device of the user in response to the determination that the execution of the program on the device resulted in the error. For example, a determination may be made that the device comprises an emulator that emulates mobile devices, and that the request is sent from the emulator, rather than from an actual mobile device.

Based on the above discussions, it can be seen that the present disclosure offers advantages over conventional fraud detection methods and systems. It is understood, however, that not all advantages are necessarily discussed in detail herein, different embodiments may offer different advantages, and that no particular advantage is required for all embodiments. One advantage is that the present disclosure can detect potential fraud. For example, a server may utilize the execution of a program (e.g., JavaScript) within a browser on a user device to throw exceptions. Based on the specific types of exceptions thrown, the server may be able to gauge whether the purported version of the browser (e.g., self-reported by the browser) is consistent with the true version of the browser associated with the exceptions thrown. This is very helpful in detecting potentially malicious activity. For example, carders—entities who buy, sell, and trade online credit card data stolen from phishing sites or from large data breaches at retail stores—may use compromised browsers, headless browsers, or mobile phone emulators to pretend that they are the actual users. They may lie to the server by editing information such as cookies, browser versions, navigator screens, etc. In some cases, the carders may use a different configuration for every victim user's account. As such, it may be difficult to implement simple rules to catch them, because even if a known configuration is bad, the server may still fail to catch other configurations that are different.

The present overcomes this problem because even though carders or other malicious entities can spoof functions or parameters of browsers, they cannot spoof bugs in the browser program and consequently the exceptions thrown by a browser. As such, the information about the true version of the browser (or other malicious tools such as the mobile phone emulator) may still be revealed via the types of exceptions thrown. In other words, the types of exceptions thrown may help the server discover inconsistencies between the actual browser version/type and the purported browser version/type, which is a more reliable indicator that the device may be compromised. The server may then take mitigating actions accordingly. Other advantages may include compatibility with existing systems and low cost of implementation.

Figure 6:
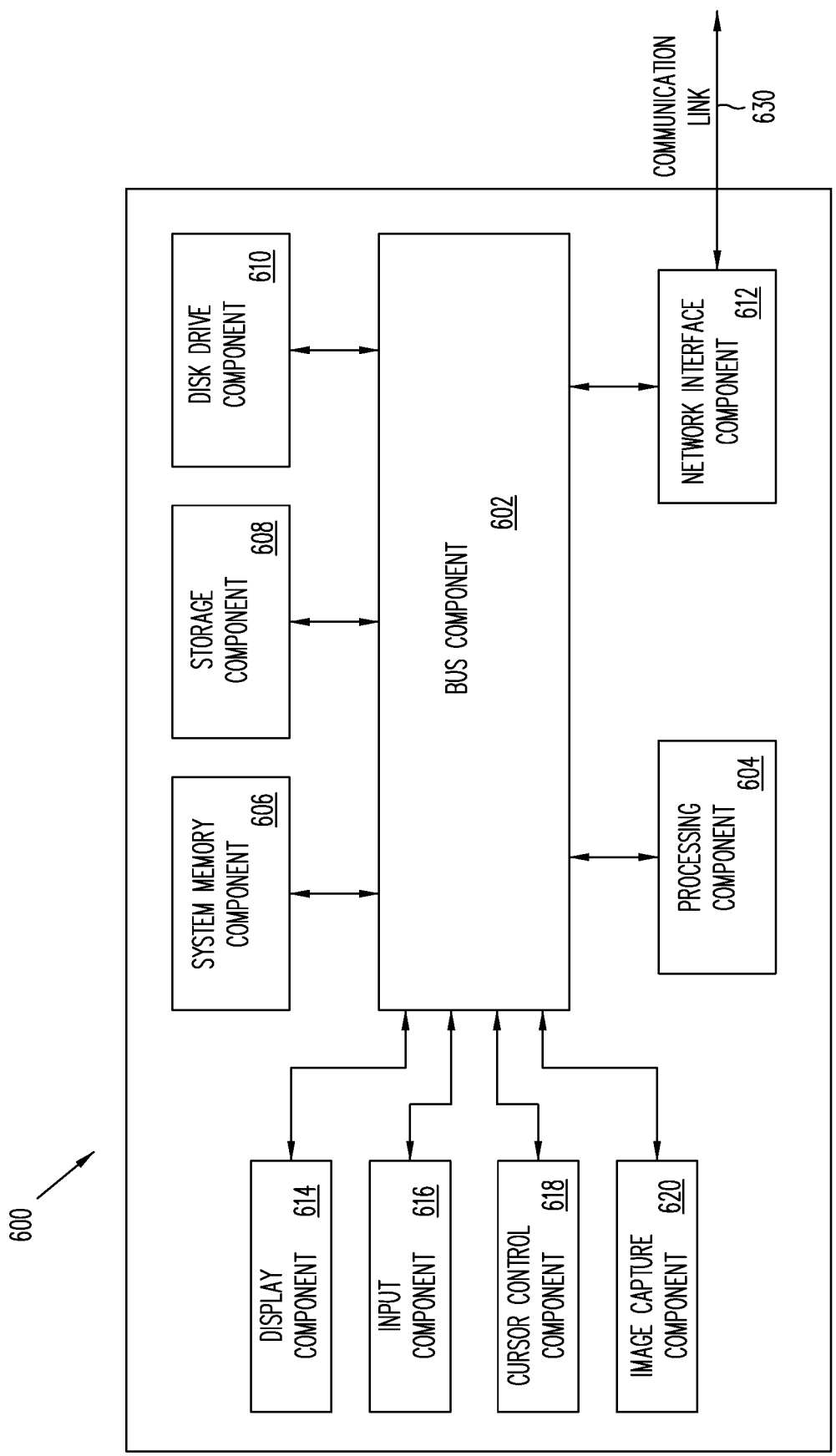
FIG. 6 is an example computer system for implementing the various steps of the methods of FIGS. 4-5 according to various aspects of the present disclosure.

FIG. 6 is a block diagram of a computer system 600 suitable for implementing various methods and devices described herein, for example, the various method steps of the methods 400 and 500. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the methods 400 and 500 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 7:
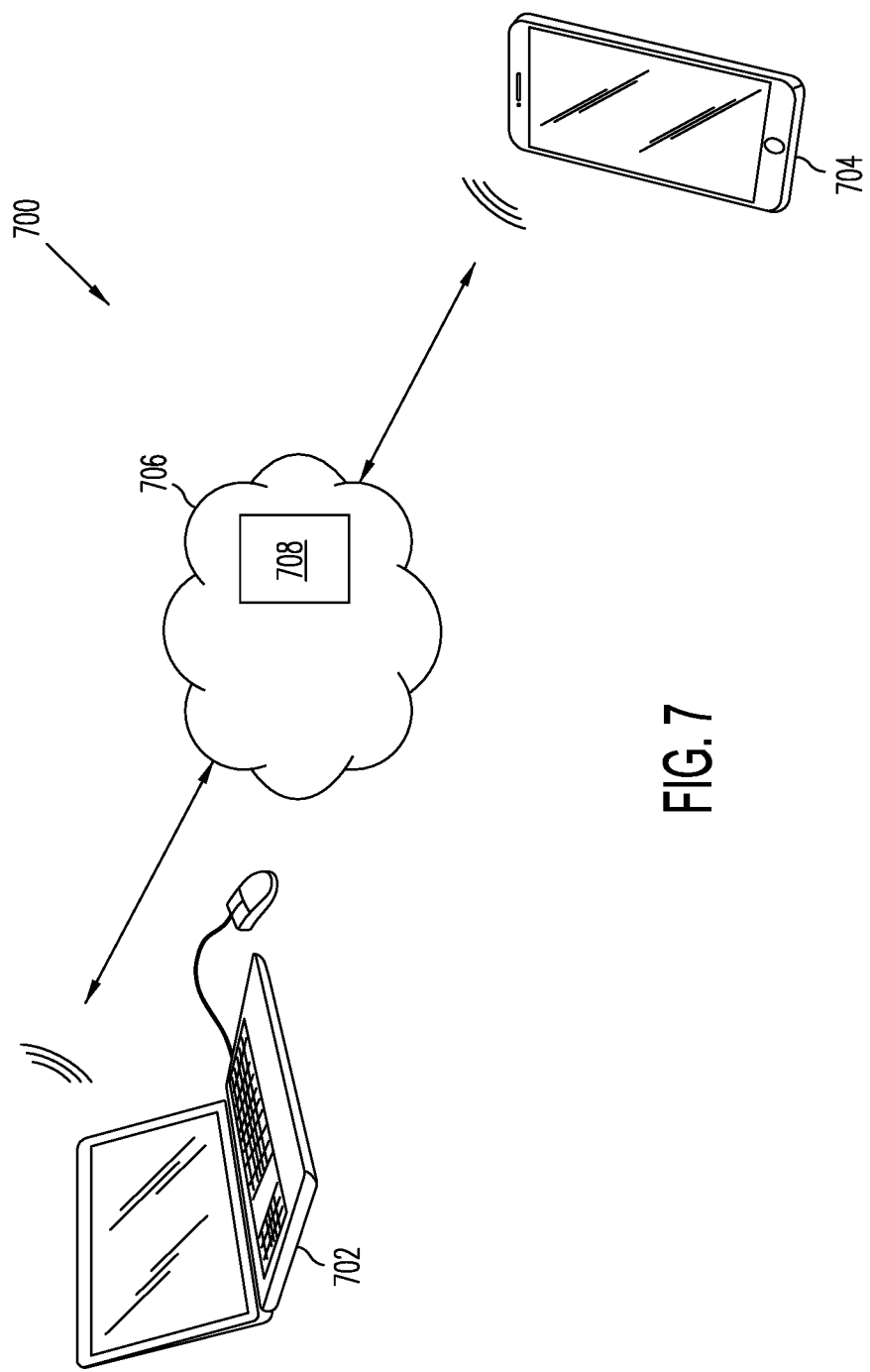
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-6.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. As another example, the mobile device 704 and the cloud-based resources 708 may work together to execute the programs 200 or 350 discussed above. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable

What is claimed is:

1. A method, comprising:

receiving, from a user device of a user, a request to access one or more server resources;

determining, based on the request, a purported version of a browser running on the user device;

causing the user device to execute a first program within the browser that is configured to throw one or more first exceptions of a particular programming language when executed by one or more particular browser versions;

analyzing results of the one or more first exceptions of the particular programming language to determine whether the purported version of the browser appears to be a true version of the browser; and causing the request to access the one or more server resources to be evaluated at an elevated risk level based on the analyzing indicating that the purported version of the browser is not accurate.

2. The method of claim 1, wherein the first program is in a web scripting language that is executable within the browser.

3. The method of claim 1, wherein the analyzing the one or more first exceptions comprise:

determining a location within a memory on the user device where the exception occurred.

4. The method of claim 1, further comprising:

causing the user device to execute a second program that is configured to throw one or more second exceptions, wherein the analyzing comprises analyzing the one or more first exceptions and the one or more second exceptions.

5. The method of claim 4, wherein:

the first program is configured to throw the one or more first exceptions for a first group of versions of the browser or a first type of the browser; and the second program is configured to throw the one or more second exceptions for a second group of versions of the browser or a second type of the browser.

6. The method of claim 1, further comprising:

determining that the browser has been spoofed in response to the analyzing indicating that the purported version of the browser is not accurate.

7. The method of claim 6, further comprising:

in response to a determination that the browser has been spoofed: causing the user device to perform a CAPTCHA test; and determining, based on a result of the CAPTCHA test, whether the user is a human user or a bot.

8. The method of claim 7, further comprising:

in response to a determination that the user is a human user, flagging an account of the user or notifying the user that suspicious activity has been detected in association with the account of the user.

9. The method of claim 7, further comprising:

in response to a determination that the user is a bot, disabling an account of the user.

10. The method of claim 1, further comprising:

determining, based on the request, a purported type of the browser running on the user device;

determining, based on the analyzing, whether the purported type of the browser appears to be a true type of the browser; and causing the request to access the one or more server resources to be evaluated at the elevated risk level in response to a determination that the purported type of the browser does not appear to be the true type of the browser.

11. The method of claim 10, wherein the determining whether the purported type of the browser appears to be the true type of the browser comprises determining that the true type of the browser includes:

a headless browser without a graphical user interface, or an anti-detect tool.

12. A system, comprising:

a non-transitory memory; and one or more hardware processors coupled to the non-transitory memory and configured to read instructions from the non-transitory memory to cause the system to perform operations comprising:

receiving, from a user device of a user, a request to access one or more resources of the system;

determining, based on the request, a purported version or a purported type of a browser running on the user device;

causing the user device to execute a first program within the browser, the first program having a web scripting language and being configured to throw one or more first exceptions in the web scripting language when executed by one or more browser versions or one or more browser types;

determining, based on a result of an execution of the first program, whether the purported version of the browser or the purported type of the browser is consistent with an actual version or an actual type of the browser running on the user device; and processing the request with an increased security level in response to a determination that the purported version or the purported type of the browser is inconsistent with the actual version or the actual type of the browser running on the user device.

13. The system of claim 12, wherein the operations further comprise:

causing the user device to execute a second program that is configured to throw one or more second exceptions;

wherein:

the first program is configured to throw the one or more first exceptions for a first group of versions of the browser or a first type of the browser;

the second program is configured to throw the one or more second exceptions for a second group of versions of the browser or a second type of the browser; and the determining whether the purported version of the browser is consistent with the actual version of the browser is based on results of executions of the first program and the second program.

14. The system of claim 12, further comprising:

determining that the browser has been modified in response to the determination that the purported version or the purported type of the browser is inconsistent with the actual version or the actual type of the browser.

15. The system of claim 12, wherein the processing the request with the increased security level comprises:

causing the user device to perform a CAPTCHA test;

determining, based on a result of the CAPTCHA test, whether the request originated from a human or from a bot; and selectively granting the request based on a result of the determining whether the request originated from the human or from the bot.

16. The system of claim 12, wherein the determining whether the purported version or the purported type of the browser is consistent with the actual version or the actual type of the browser comprises determining that the browser actually running on the user device is a headless browser without a graphical user interface.

* * * * *